United States Patent
Kong et al.

(10) Patent No.: US 8,631,264 B2
(45) Date of Patent: Jan. 14, 2014

(54) COMPUTER SYSTEM

(75) Inventors: Ting-Ting Kong, Shanghai (CN); Wen-Kang Fan, Taipei (TW)

(73) Assignee: Inventec Corporation, Taipei (TW)

( * ) Notice: Subject to any disclaimer, the term of this patent is extended or adjusted under 35 U.S.C. 154(b) by 396 days.

(21) Appl. No.: 12/942,023

(22) Filed: Nov. 9, 2010

(65) Prior Publication Data
US 2012/0042177 A1    Feb. 16, 2012

(30) Foreign Application Priority Data
Aug. 12, 2010    (CN) .......................... 2010 1 0253595

(51) Int. Cl.
G06F 1/00    (2006.01)
(52) U.S. Cl.
USPC ........................................................ 713/324
(58) Field of Classification Search
None
See application file for complete search history.

(56) References Cited

U.S. PATENT DOCUMENTS

| | | | |
|---|---|---|---|
| 6,851,068 B2 * | 2/2005 | Jochiong et al. | 713/330 |
| 6,862,641 B1 * | 3/2005 | Strongin et al. | 710/260 |
| 2006/0190938 A1 * | 8/2006 | Capek et al. | 717/161 |

* cited by examiner

*Primary Examiner* — Kim Huynh
*Assistant Examiner* — Austin Hicks
(74) *Attorney, Agent, or Firm* — CKC & Partners Co., Ltd.

(57) ABSTRACT

The present invention provides a computer system, comprising: a plurality of power suppliers; and a plurality of mainboards, each of which is electrically connected to the corresponding one of the plurality of power suppliers. Each mainboard comprises a switch module for generating a switch-on signal; a control module for receiving the switch-on signal and generating a power enable signal according to the switch-on signal; and a cascade module, electrically connected to the power supplier relative to the mainboard and the control module, for receiving the power enable signal, wherein the cascade module of the respective mainboard electrically connects to each other, and, when the control module of any mainboard sends out the power enable signal, it will be transferred to the other mainboards via the mainboard's cascade module, so that the plurality of power suppliers can provide power to the corresponding mainboard to implement the mainboard's booting synchronously.

10 Claims, 3 Drawing Sheets

COMPUTER SYSTEM

RELATED APPLICATIONS

This application claims priority to China Application Serial Number 201010253595.3, filed Aug. 12, 2010, which is herein incorporated by reference.

BACKGROUND

1. Field of Invention

The present invention relates to a computer system, and more particularly relates to a computer system for providing power to a plurality of mainboards synchronously.

2. Description of Related Art

Along with the development of information and communication technology, an increasingly large control mainboard is required to be developed for a computer system. Conventional mainboards are generally server or exchanger mainboards. When these mainboards are actuated to work, the power buttons of these mainboards need to be manually pressed to receive the power provided by external power sources, thereby meeting the working requirements of the mainboards.

However, when the number of the control mainboards of the computer system is quite large, the manual manner for actuating one by one not only causes a waste of plenty of labors but also cannot meet the requirement for synchronously controlling the power supply of the control mainboards. In addition, when a plurality of mainboards must be supplied with power synchronously to ensure the quality of communication or instantaneity of data exchange, communication or data exchange errors easily occur.

Therefore, it is desired to provide a computer system to solve the problem that the power supply of the mainboards cannot be synchronously controlled.

SUMMARY

In view of the above, the present invention primarily aims to provide a computer system, which is capable of synchronously providing power to a plurality of mainboards, so as to solve the above problem of the power supply of the plurality of mainboards.

According to one aspect of the present invention, a computer system is provided, which includes:

a plurality of power suppliers; and a plurality of mainboards, each of which is electrically connected to the corresponding one of the plurality of power suppliers, wherein each power supplier provides power to each corresponding mainboard, and each of the plurality of mainboards includes: a switch module for generating a switch-on signal; a control module for receiving the switch-on signal and generating a power enable signal according to the switch-on signal; and a cascade module, electrically connected to the power supplier relative to the mainboard and the control module, for receive the power enable signal;

wherein the cascade module of the respective mainboard electrically connects to each other, when the control module of any mainboard sends out the power enable signal, the power enable signal is transferred to the cascade modules of the other mainboards via the cascade module of the mainboard, and thus the cascade modules of all the mainboards synchronously transfer the power enable signal to the corresponding power supplier, so that the plurality of power suppliers can provide power to the corresponding mainboard to implement the mainboard's booting synchronously.

Preferably, the computer system has a plurality of cases, each of which has at least one of the mainboards.

Preferably, the control module is a South Bridge chip.

Preferably, each of the plurality of mainboards further includes a power connector and a control signal connector, the plurality of power suppliers are respectively connected to the power connector and the control signal connector of the corresponding mainboard, and the cascade module is electrically connected to the corresponding power supplier via the control signal connector.

Preferably, after respectively receiving the power enable signal, the plurality of power suppliers respectively send a Power Good Signal (PGS) to the control module of the corresponding mainboard and then begin to provide power to the corresponding mainboard.

According to another aspect of the present invention, a computer system is provided, which includes:

a power supplier; and a plurality of first mainboards and a second mainboard, which are respectively electrically connected to the power supplier, wherein the plurality of first mainboards and the second mainboard respectively include: a switch module for generating a switch-on signal; a control module for receiving the switch-on signal and generating a power enable signal according to the switch-on signal; and a cascade module, electrically connected to the control module, for receiving the power enable signal;

wherein, the cascade modules of the plurality of first mainboards and the cascade module of the second mainboard electrically connect to each other, and the cascade module of the second mainboard is electrically connected to the power supplier, wherein, when the control module of one of the plurality of first mainboards and the second mainboard sends out the power enable signal, the power enable signal is transferred to the power supplier via the cascade module of the second mainboard, so that the power supplier provides power to the plurality of first mainboards and the second mainboard to implement the synchronous booting of the plurality of first mainboards and the second mainboard.

Preferably, the computer system has a plurality of cases, each of which has at least one of the plurality of first mainboards and the second mainboard.

Preferably, the control module is a South Bridge chip.

Preferably, each of the plurality of first mainboards further includes a first power connector, the second mainboard further includes a second power connector and a second control signal connector, the first power connector and the second power connector are electrically connected to the power supplier, and the cascade modules of the plurality of first mainboards and the cascade module of the second mainboard are electrically connected to the power supplier via the second control signal connector.

Preferably, after receiving the power enable signal, the power supplier sends a Power Good Signal (PGS) to the control module of the second mainboard and then provides power to the plurality of first mainboards and the second mainboard.

In view of the above, the computer system of the present invention is used to control the power suppliers to synchronously provide power to a plurality of mainboards via the power enable signal sent by one mainboard, thereby solving the above problem that the power suppliers of the mainboards cannot be synchronously controlled.

BRIEF DESCRIPTION OF THE DRAWINGS

To make the objectives, features, advantages and embodiments of the present invention more apparent, the accompanying drawings are illustrated in detail as follows.

DETAILED DESCRIPTION

Figure 1:
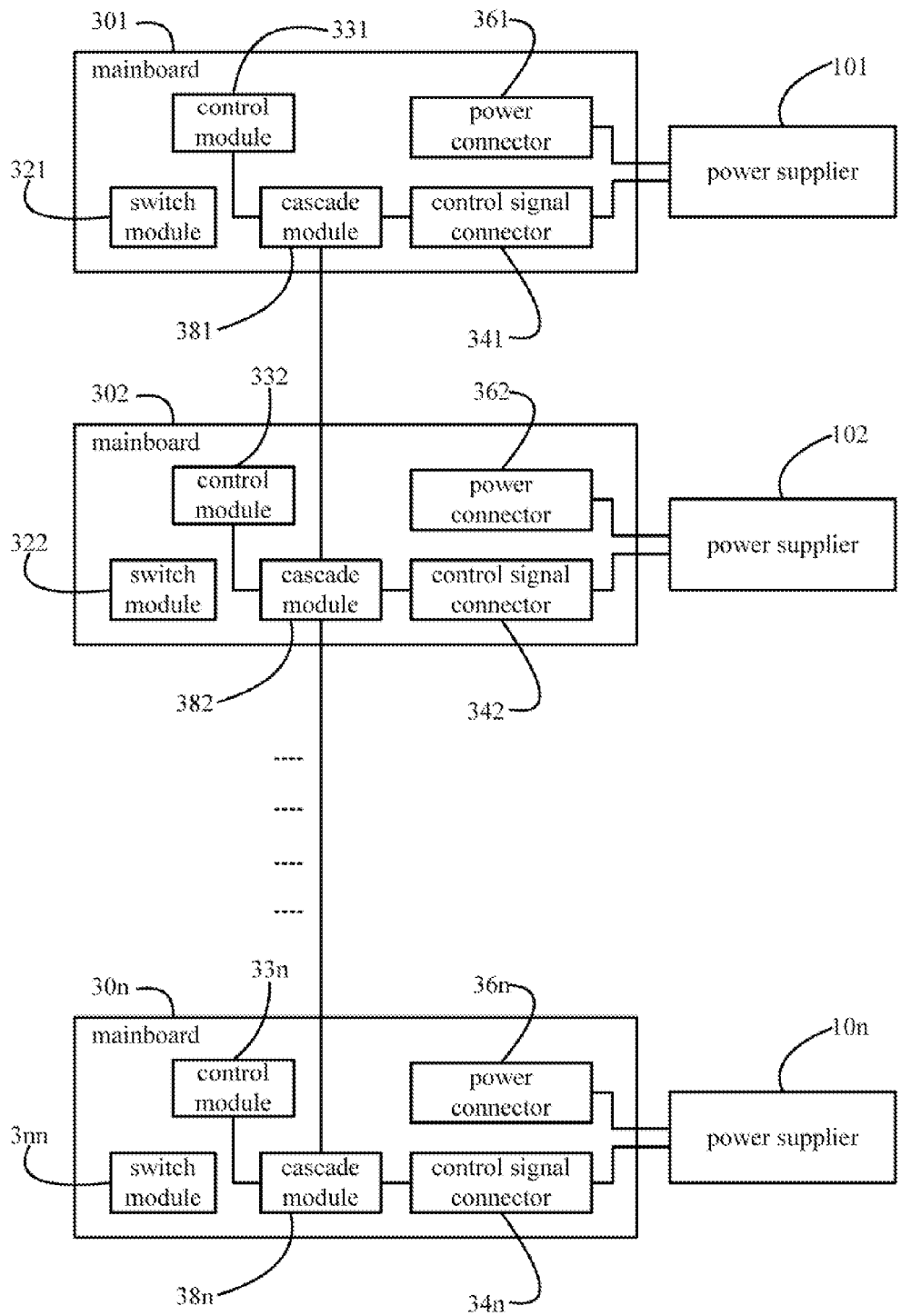
FIG. 1 is a schematic view of a computer system module in an embodiment of the present invention.

Referring to FIG. 1, a computer system in an embodiment of the present invention is shown. In the embodiment of FIG. 1, the computer system includes a plurality of power suppliers (marked by number 101, 102, . . . , 10n) and a plurality of mainboards (marked by number 301, 302, . . . , 30n) correspondingly connected to the power suppliers. Each power supplier provides power to each corresponding mainboard, and each of the mainboards 301 to 30n includes a switch module, a control module and a cascade module, i.e., the mainboard 301 includes a switch module 321, a control module 331 and a cascade module 381; the mainboard 302 includes a switch module 322, a control module 332 and a cascade module 382; and the mainboard 30n includes a switch module 32n, a control module 33n and a cascade module 38n.

The mainboard 301 is taken as an example for illustration of the connection relationship between the switch module, the control module and the cascade module in the mainboard. The switch module 321 is used for generating a switch-on signal. The control module 331 is used for receiving the switch-on signal generated by the switch module 321 and generating a power enable signal according to the switch-on signal. The cascade module 381 is electrically connected to the power supplier 101 and the control module 331 corresponding to the mainboard 301, and the cascade module 381 receives the power enable signal from the control module 331. Moreover, the cascade module 381 of the mainboard 301, the cascade module 382 of the mainboard 302, . . . , the cascade module 38n of the mainboard 30n electrically connect to each other, and, when the control module (control module 331 or 332 or 33n) of any mainboard sends out the power enable signal, the power enable signal is transferred to the cascade modules of the other mainboards via the cascade module of the corresponding mainboard, and thus the cascade modules of all the mainboards synchronously transfer the power enable signal to each corresponding power supplier, so that the plurality of power suppliers can provide power to each corresponding mainboard, thereby implementing the mainboard's booting synchronously.

According to an embodiment, the computer system of FIG. 1 further has a plurality of cases, that is to say, a plurality of mainboards 301, 302, . . . , 30n are respectively accommodated in the corresponding case, and each case has at least one of the plurality of mainboards. In other embodiments, the computer system may have at least one case, and the at least one case may accommodate at least one of the plurality of mainboards.

According to another embodiment, any mainboard of the plurality of mainboards in FIG. 1 may further include a power connector and a control signal connector, i.e., the mainboard 301 includes a power connector 361 and a control signal connector 341, the mainboard 302 includes a power connector 362 and a control signal connector 342, and the mainboard 30n includes a power connector 36n and a control signal connector 34n. Taking the mainboard 301 as an example, the power supplier 101 is respectively connected to the power connector 361 and the control signal connector 341 of the mainboard 301, and the cascade module 381 is electrically connected to the power supplier 101 via the control signal connector 341. Preferably, after receiving the power enable signal, the power suppliers 101, 102, . . . , 10n respectively send a Power Good Signal (PGS) to the control modules of the corresponding mainboards 301, 302, . . . , 30n, and then provide power to the corresponding mainboards.

Moreover, in this embodiment, the control module 331 may be a South Bridge chip, and those skilled in the art should understand that in another embodiment the control module 331 may be another intelligent chip or software driver etc.

In addition, the power supplier 101 may be a basic power supply unit, such as a power source, an adjustable power source, a power supply adaptation unit and a PWM switch-regulated power source, which can provide a high-level voltage or a low-level voltage required by the mainboard 301 according to the power enable signal, so as to meet the working requirement of the mainboard 301. Herein, the working principle of the power supplier 101 will not be described. Since the structures of the mainboards 301, 302, . . . , 30n are the same and the power suppliers 101, 102 to 10n are also the same, only the mainboard 301, the control module 331 and the power supplier 101 are taken as an example for illustrating the computer system in this embodiment.

As described above, with the computer system of FIG. 1, when the plurality of mainboards need to be powered synchronously, the plurality of mainboard may be controlled to be actuated synchronously by manually actuating only one mainboard, which not only saves manpower but also implements the synchronous control in providing power to the mainboards.

Figure 2:
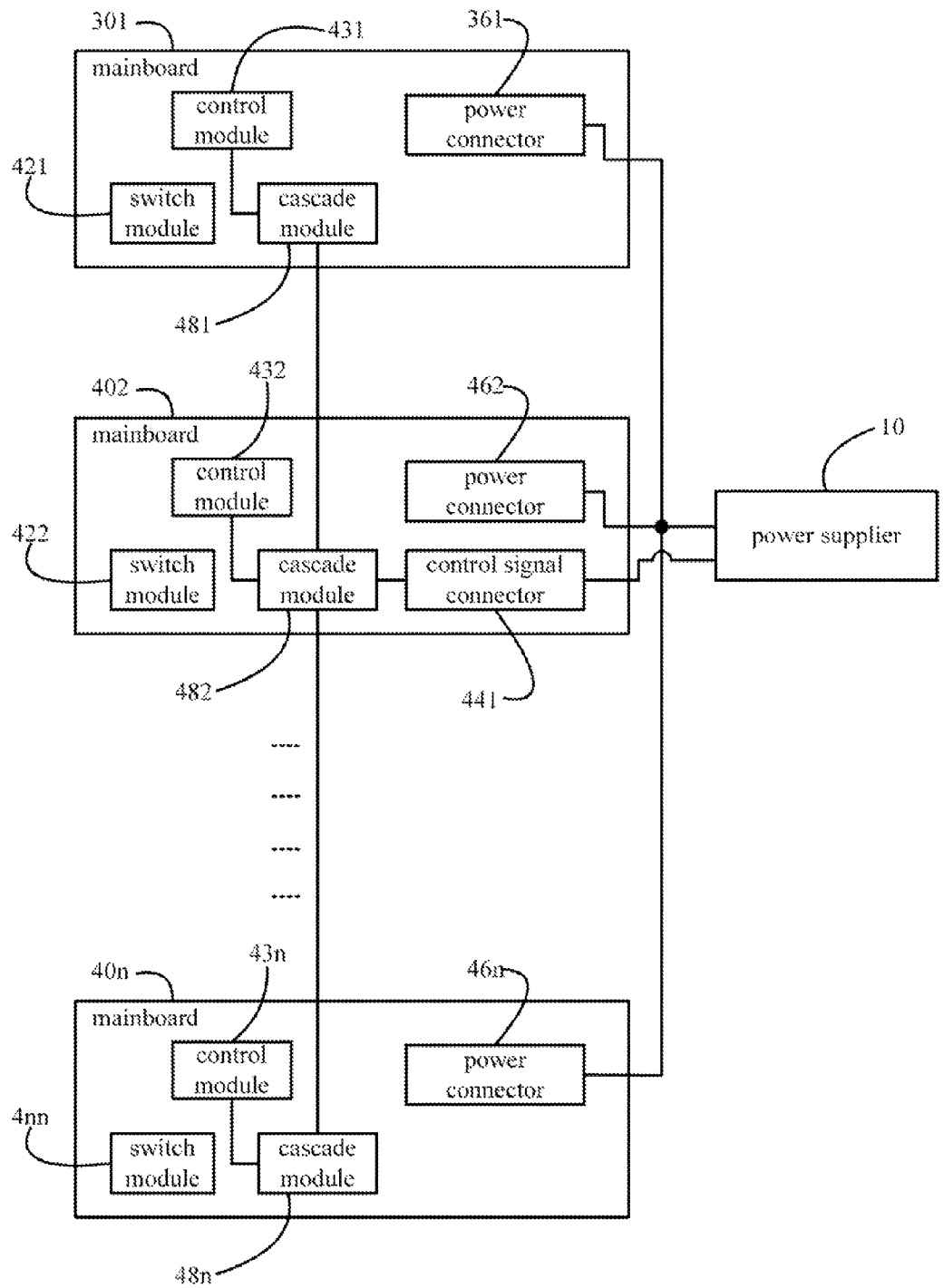
FIG. 2 is a schematic view of a computer system module in another embodiment of the present invention.

Referring to FIG. 2, a computer system in another embodiment of the present invention is shown. In the embodiment shown in FIG. 2, the computer system includes a single power supplier (marked by number 10) and a plurality of mainboards (marked by number 401, 402, . . . , 40n) electrically connected to is the power supplier 10. The single power supplier provides power to each mainboard, and each of the mainboards 401 to 40n includes a switch module, a control module and a cascade module, that is to say, the mainboard 401 includes a switch module 421, a control module 431 and a cascade module 481; the mainboard 402 includes a switch module 422, a control module 432 and a cascade module 482; and the mainboard 40n includes a switch module 42n, a control module 43n and a cascade module 48n.

It should be particularly pointed out that the cascade module 482 of the mainboard 402 is electrically connected to the power supplier 10, but the cascade modules 481 and 48n of other mainboards need not be electrically connected to the power supplier 10. For clarity, the mainboards 401 and 40n are referred to as the "first mainboards" and the mainboard 402 is referred to as the "second mainboard". Likewise, the mainboard 401 is taken as an example for describing the connection relationship between the switch module, the control module and the cascade module in the mainboard. The switch module 421 is used for generating a switch-on signal. The control module 431 is used for receiving the switch-on signal generated by the switch module 421 and generating a power enable signal according to the switch-on signal. The cascade module 481 is electrically connected to the control module 431 and receives the power enable signal from the control module 431. Moreover, the cascade modules 481 and 48n of the plurality of first mainboards (e.g. the mainboards 401 and 40n) and the cascade module 482 of the second mainboard (the mainboard 402) electrically connect to each other. Since the cascade module 482 of the second mainboard is electrically connected to the power supplier 10, when any control module of the plurality of first mainboards and the second mainboard sends out the power enable signal, the power enable signal can be transferred to the power supplier via the cascade module 482 of the second mainboard, so that the power supplier provides power to the plurality of first mainboards and the second mainboard to implement the synchronous booting of the plurality of first mainboards and the second mainboard.

According to an embodiment, the computer system of FIG. 2 further has a plurality of cases, that is to say, the plurality of mainboards 401, 402, ..., 40n are respectively accommodated in the corresponding cases, and each case has at least one of the plurality of mainboards. In other embodiments, the computer system may have at least one case, and the at least one case may accommodate at least one of the plurality of mainboards.

According to another embodiment, any one of the plurality of first mainboards (e.g. the mainboards 401 and 40n) of FIG. 2 may further include a first power connector (e.g. the power connector 461 or 46n), and the second mainboard (e.g. the mainboard 402) may further include a second power connector (e.g. the power connector 462) and a second control signal connector (e.g. the control signal connector 441). The power connectors 461, 462 and 46n are all electrically connected to the power supplier 10, and the cascade modules 481 and 48n of the mainboards 401 and 40n and the cascade module 482 of the mainboard 402 are all connected to the power supplier 10 via the control signal connector 441. Preferably, after receiving the power enable signal, the power supplier 10 sends a Power Good Signal (PGS) to the control module 432 of the mainboard 402 and then provides power to the mainboards 401, 402 and 40n.

Moreover, in this embodiment, the control module 431 may be a South Bridge chip, and those skilled in the art should understand that in another embodiment the control module 431 may be another intelligent chip or software driver etc.

In addition, the power supplier 10 may be a basic power supply unit, e.g. a power source, an adjustable power source, a power supply adaptation unit and a PWM switch-regulated power source etc., which can provide a high-level voltage or a low-level voltage required by the mainboard 401 according to the power enable signal, so as to meet the working requirement of the mainboard 401. Herein, the working principle of the power supplier 10 will not be described.

Figure 3:
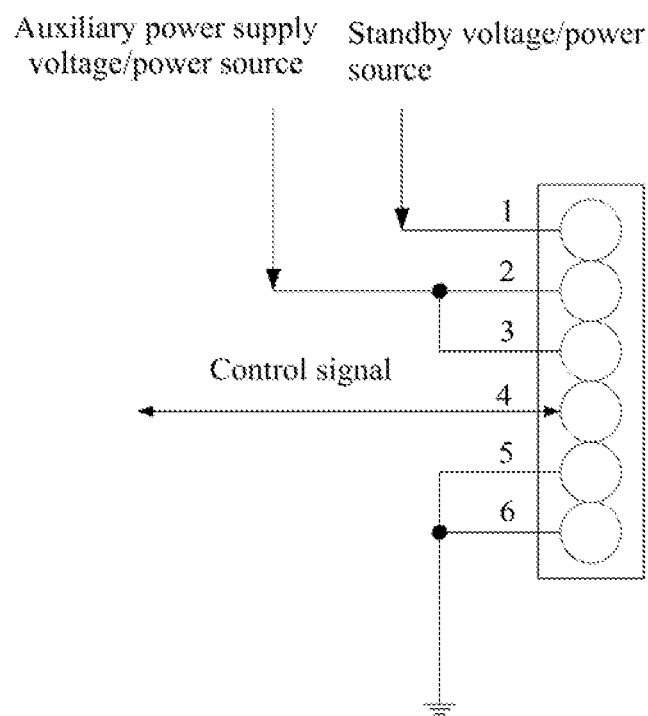
FIG. 3 is a schematic structural view of a cascade module of a computer system in yet another embodiment of the present invention.

Referring to FIG. 3, a schematic structural view of a cascade module of a computer system in yet another embodiment of the present invention is shown. In this embodiment, the cascade module may include a plurality of I/O ports, respectively for inputting/outputting the above power enable signal or for inputting/outputting other voltage signals in an extendable way, so that, when the power supplier cannot meet the power supply requirement of the mainboard, an auxiliary power supply function is provided.

FIG. 3 illustrates a cascade module including 1-6 I/O ports, wherein the 1st I/O port may load a standby working voltage for providing a standby voltage when the mainboard is in standby mode. The 2nd-3rd I/O ports may load an auxiliary power supply voltage for providing an auxiliary power supply voltage when the power supplier cannot meet the power supply requirement. The 4th I/O port is used for the cascade of the mainboard and the input/output of a signal. The 5th-6th I/O ports are used for grounding, so as to provide a complete circuit structure for the cascade module. Thus, the cascade module may be extended to cascade a variety of signals that can be used for synchronous control, but is not limited to the power enable signal of the present invention. Therefore, those skilled in the art should understand that the structure of the cascade module shown in FIG. 3 is only taken as an example for illustrating the functions of the cascade module of the computer system of the present invention and is not intended to limit the scope of the present invention.

Therefore, with the detailed description of the above embodiments, the computer system of the present invention allows controlling the synchronous power actuation or shutdown of a plurality of mainboards only by manually actuating or shutting down one mainboard when the plurality of mainboards need to be synchronously powered on or off. The present invention not only saves manpower but also implements the synchronous control over the booting and shutdown of the mainboards.

Although the embodiments of the present invention are disclosed in the above, it should be understood that the embodiments are not intended to limit the scope of the present invention, and those skilled in the art can make alternations and modifications without departing from the spirit and scope of the present invention. Therefore, the protection scope of the present invention is defined by the claims hereinafter.

What is claimed is:

1. A computer system, comprising:
  a plurality of power suppliers; and
  a plurality of mainboards, each of which is electrically connected to the corresponding one of the power suppliers, wherein each power supplier provides power to each corresponding mainboard, and each of the mainboards comprises:
  a switch module for generating a switch-on signal;
  a control module for receiving the switch-on signal and generating a power enable signal according to the switch-on signal; and
  a cascade module, electrically connected to the power supplier relative to the mainboard and the control module, for receiving the power enable signal;
  wherein, the cascade module of the respective mainboard electrically connects to the other cascade modules, and, when the control module of any mainboard sends out the power enable signal, the power enable signal is transferred via the cascade module of the mainboard to the cascade modules of the other mainboards, and thus the cascade modules of all the mainboards synchronously transfer the power enable signal to the corresponding power supplier, so that the power suppliers provide power to the corresponding mainboard to implement the mainboard's booting synchronously.

2. The computer system according to claim 1, further comprising a plurality of cases, each of which has at least one of the mainboards.

3. The computer system according to claim 1, wherein the control module is a South Bridge chip.

4. The computer system according to claim 1, wherein each of the mainboards further comprises a power connector and a control signal connector, the power suppliers are respectively connected to the power connector and the control signal connector of the corresponding mainboard, and the cascade module is electrically connected to the corresponding power supplier via the control signal connector.

5. The computer system according to claim 1, wherein, after receiving the power enable signal, the power suppliers respectively send a Power Good Signal (PGS) to the control module of the corresponding mainboard and then provide power to the corresponding mainboard.

6. A computer system, comprising:
  a power supplier; and
  a plurality of first mainboards and a second mainboard, which are respectively electrically connected to the power supplier, wherein each of the first mainboards and the second mainboard respectively comprises:

a switch module for generating a switch-on signal;

a control module for receiving the switch-on signal and generating a power enable signal according to the switch-on signal; and a cascade module, electrically connected to the control module, for receiving the power enable signal;

wherein each cascade modules of the first mainboards or the second mainboard electrically connects to the other cascade modules of the first mainboards or the second mainboard, and the cascade module of the second mainboard is electrically connected to the power supplier, wherein, when the control module of one of the first mainboards and the second mainboard sends out the power enable signal, the power enable signal is transferred to the power supplier via the cascade module of the second mainboard, so that the power supplier provides power to the first mainboards and the second mainboard to implement the synchronous booting of the first mainboards and the second mainboard.

7. The computer system according to claim 6, further comprising a plurality of cases, each of which has at least one of the first mainboards and the second mainboard.

8. The computer system according to claim 6, wherein the control module is a South Bridge chip.

9. The computer system according to claim 6, wherein, each of the first mainboards further comprises a first power connector; the second mainboard further comprises a second power connector and a second control signal connector, the first power connector and the second power connector are electrically connected to the power supplier, and the cascade modules of the first mainboards and the cascade module of the second mainboard are electrically connected to the power supplier via the second control signal connector.

10. The computer system according to claim 6, wherein, after receiving the power enable signal, the power supplier sends a Power Good Signal (PGS) to the control module of the second mainboard and then provides power to the first mainboards and the second mainboard.

\* \* \* \* \*